United States Patent
Taira et al.

(10) Patent No.: US 6,644,047 B2
(45) Date of Patent: Nov. 11, 2003

(54) AIR CONDITIONER

(75) Inventors: Shigeharu Taira, Kusatsu (JP); Youichi Ohnuma, Kusatsu (JP); Masahito Yoshizawa, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/131,000

(22) PCT Filed: Sep. 21, 2001

(86) PCT No.: PCT/JP01/08229

§ 371 (c)(1),
(2), (4) Date: May 24, 2002

(87) PCT Pub. No.: WO02/27245

PCT Pub. Date: Apr. 4, 2002

(65) Prior Publication Data

US 2002/0178738 A1 Dec. 5, 2002

(30) Foreign Application Priority Data

Sep. 26, 2000 (JP) ........................................ 2000-292245
Sep. 26, 2000 (JP) ........................................ 2000-292246

(51) Int. Cl.$^7$ .......................... G01K 13/00; F25D 17/00
(52) U.S. Cl. ............................................. 62/129; 62/181
(58) Field of Search ........................ 62/129, 125, 126, 62/180, 181, 186

(56) References Cited

U.S. PATENT DOCUMENTS

| | | | | |
|---|---|---|---|---|
| 5,649,429 A | * | 7/1997 | Schreiber ...................... | 62/186 |
| 5,660,051 A | * | 8/1997 | Sakakibara et al. ........... | 62/133 |
| 5,694,779 A | * | 12/1997 | Matsushima et al. ......... | 62/114 |
| 5,918,475 A | * | 7/1999 | Sakakibara et al. ........... | 62/186 |
| 6,073,455 A | * | 6/2000 | Tachigori et al. .............. | 62/129 |
| 6,085,531 A | * | 7/2000 | Numoto et al. ................ | 62/149 |

FOREIGN PATENT DOCUMENTS

| | | | | |
|---|---|---|---|---|
| JP | 7-159010 A | | 6/1995 | |
| JP | 07-159010 | * | 6/1995 | ........... F25B/49/02 |
| JP | 8-178397 A | | 7/1996 | |
| JP | 08-178397 | * | 7/1996 | ............ F24F/11/02 |

* cited by examiner

Primary Examiner—Marc Norman
(74) Attorney, Agent, or Firm—Birch, Stewart, Kolasch & Birch, LLP (57) ABSTRACT

An air conditioner employing a flammable refrigerant, comprises a sensor (11) that is provided on an external surface of an indoor unit (1) and detects the flammable refrigerant gas, in order to prevent the accident of a fire or the like even when the flammable refrigerant leaks. Furthermore, an air conditioner is provided with a indoor unit housing a heat exchanger (3) and a fan (7) inside its casing (2) that has an inlet port (8) and an outlet port (5). The air conditioner rotates the fan (7) and flows the flammable refrigerant through the heat exchanger (3) during operation, performing heat exchange between air taken into the casing (2) through the inlet port (8) and the flammable refrigerant, and blows out the air that has undergone the heat exchange to the inside of a room through the outlet port (5). The air conditioner comprises a sensor (11) that is provided on an external surface of the casing (2) and detects a flammable refrigerant gas and a control section (9) for executing control to rotate the fan (7) when the sensor (11) detects the flammable refrigerant gas.

20 Claims, 6 Drawing Sheets

AIR CONDITIONER

TECHNICAL FIELD

The present invention relates to air conditioners, and in particular, to an air conditioner that employs a flammable refrigerant (including slightly flammable refrigerant, this holding true throughout this specification).

BACKGROUND ART

In recent years, there has been proposed an air conditioner that employs a flammable refrigerant of R32 or the like as an alternative refrigerant substituting for R22. In the air conditioner that employs this kind of flammable refrigerant, there is concern about an accident such that the flammable refrigerant leaks from the inside of an indoor unit or a refrigerant pipe (connecting pipe) connected to the indoor unit to the outside, causing a fire or generating a toxic gas due to deficiency of oxygen and thermal decomposition (referred to as an "accident of a fire or the like").

However, it is difficult to say that conventional air conditioners have taken sufficient measures against the case of flammable refrigerant leak.

DISCLOSURE OF THE INVENTION

Accordingly, the object of this invention is to provide an air conditioner capable of preventing the accident of a fire or the like even in the case of flammable refrigerant leak.

In order to achieve the above-mentioned object, the present invention provides an air conditioner employing a flammable refrigerant, comprising a sensor that is provided on an external surface of an indoor unit and detects a flammable refrigerant gas.

The air conditioner of the present invention is provided with the sensor that is provided on the external surface of the indoor unit and detects the flammable refrigerant gas. Therefore, when the flammable refrigerant leaks from the refrigerant pipe (connecting pipe) connected to the indoor unit into a room or when the flammable refrigerant that has leaked inside the indoor unit flows to the outside of the indoor unit through a gap of the casing, then the refrigerant that has leaked and gasified can be detected by the sensor. Therefore, it is enabled to issue a warning based on the output of the sensor or shut off the refrigerant circuit. As a result, the accident of a fire or the like can be prevented.

In order to achieve the above-mentioned object, the present invention provides an air conditioner, which is provided with a indoor unit housing a heat exchanger and a fan inside its casing that has an inlet port and an outlet port, rotates the fan and flows the flammable refrigerant through the heat exchanger during operation, performing heat exchange between air taken into the casing through the inlet port and the flammable refrigerant, and blows out the air that has undergone the heat exchange to the inside of a room through the outlet port, comprising a sensor that is provided on an external surface of the casing and detects a flammable refrigerant gas, and a control section for executing control to rotate the fan when the sensor detects the flammable refrigerant gas.

The air conditioner of the present invention is provided with the sensor that is provided on the external surface of the casing of the indoor unit and detects the flammable refrigerant gas. Therefore, when the flammable refrigerant leaks from the refrigerant pipe (connecting pipe) connected to the indoor unit into a room or when the flammable refrigerant that has leaked inside the indoor unit flows to the outside of the indoor unit through a gap of the casing, then the refrigerant that has leaked and gasified can be detected by the sensor. When the sensor detects the flammable refrigerant gas, the control section executes control to rotate the fan. By this operation, the refrigerant gas can be diffused to have a concentration not higher than the lower flammability limit concentration by virtue of an air flow generated by the rotation of the fan, i.e., a flow of air, which has been taken into the casing through the inlet port and blown out to the inside of the room through the outlet port. As a result, the accident of a fire or the like can be prevented.

Moreover, the fan has originally been provided for the indoor unit, and the hardware that constitutes the control section can be made common to the one that has originally been provided for the operation of the air conditioner. Therefore, in applying the present invention to an ordinary air conditioner, no particular cost increase is caused.

In an embodiment of the present invention, the indoor unit is of a floor type, and the sensor is provided in a lower portion of the indoor unit.

The flammable refrigerant of R32 or the like has the property that it is heavier than air. Therefore, when the indoor unit is placed on a floor, the flammable refrigerant that has leaked from the refrigerant pipe (connecting pipe) connected to the indoor unit into a room and the flammable refrigerant that has leaked inside the indoor unit and flowed out of the indoor unit through the gap of the casing tend to be collected on the indoor floor. In this case, according to the air conditioner of this one embodiment, the sensor is provided in a lower portion of the indoor unit. Therefore, the flammable refrigerant gas collected on the indoor floor can reliably be detected by the sensor. Therefore, the accident of a fire or the like can reliably be prevented. Moreover, if the control section executes the control to rotate the fan when the sensor detects the flammable refrigerant gas, then the flammable refrigerant gas collected on the indoor floor is effectively diffused by the air flow generated by the rotation of the fan, i.e., the flow of air, which has been taken into the casing through the inlet port and blown out to the inside of the room through the outlet port, and is made to have a concentration not higher than the lower flammability limit concentration. Therefore, the accident of a fire or the like can reliably be prevented.

In an embodiment of the present invention, the indoor unit is of a ceiling recessed type, and the sensor is provided in a lower portion that belongs to the indoor unit and faces the reverse side of ceiling board.

As described above, the flammable refrigerant of R32 or the like has the property that it is heavier than air. Therefore, when the indoor unit is set in a ceiling, the flammable refrigerant that has leaked from the refrigerant pipe (connecting pipe) connected to the indoor unit into the room and the flammable refrigerant that has leaked inside the indoor unit and flowed to the outside of the indoor unit through the gap of the casing are possibly collected in the roof space. In this case, according to the air conditioner of this one embodiment, the sensor is provided in the lower portion that belongs to the indoor unit and faces the roof space. Therefore, the flammable refrigerant gas collected in the roof space can reliably be detected by the sensor. Therefore, the accident of a fire or the like can reliably be prevented.

In an embodiment of the present invention, the sensor is arranged in an opening located in a lower portion of the casing of the indoor unit and detects a flammable refrigerant gas leaked to the outside and inside of the indoor unit.

As described hereinabove, the flammable refrigerant of R32 or the like has the property that it is heavier than air. Therefore, the flammable refrigerant that has leaked inside the indoor unit tends to be collected in the lower portion of the indoor unit. In this case, according to the air conditioner of the fourth inventive aspect, the sensor is arranged at the opening located in the lower portion of the casing of the indoor unit and detects the flammable refrigerant gas that has leaked to the outside and inside of the indoor unit. Therefore, not only the flammable refrigerant gas that has leaked to the outside of the indoor unit but also the flammable refrigerant gas that has leaked inside the indoor unit can reliably be detected by the sensor. Therefore, the accident of a fire or the like can reliably be prevented. Moreover, if the control section executes the control to rotate the fan when the sensor detects the flammable refrigerant gas, then the flammable refrigerant gas leaked inside the indoor unit is effectively diffused by the air flow generated by the rotation of the fan, i.e., the flow of air, which has been taken into the casing through the inlet port and blown out to the inside of a room through the outlet port, and is made to have a concentration not higher than the lower flammability limit concentration. Therefore, the accident of a fire or the like can reliably be prevented.

Moreover, the flammable refrigerant gas that has leaked from one indoor unit and its surroundings can reliably be detected by the sensor. Therefore, one indoor unit is permitted to have only one flammable refrigerant gas detection sensor in order to prevent the accident of a fire or the like, and cost increase can be suppressed. To provide sensors for detecting the refrigerant gas in the portions where refrigerant leak possibly occurs, or, for example, in each of the connecting portions of the refrigerant pipes and the heat exchanger inside the indoor unit leads to an increase in the number of sensors and further cost increase.

In an embodiment of the present invention, the air conditioner comprises means for issuing a warning when the sensor detects the flammable refrigerant gas.

In the air conditioner of this embodiment, a warning is issued when the sensor detects the flammable refrigerant gas. Therefore, the user can perceive the leak of the flammable refrigerant and take the measures of ventilating the room, calling serviceman for repair and the like.

In an embodiment of the present invention, the air conditioner comprises a control section for executing control to stop operation of a refrigerant circuit of the air conditioner when the sensor detects the flammable refrigerant gas.

In the air conditioner of this embodiment, the control section executes the control to stop the operation of the refrigerant circuit of this air conditioner when the sensor detects the flammable refrigerant gas. Therefore, the refrigerant circuit is shut off by the valve that exists in the refrigerant circuit, and the leak of flammable refrigerant is restrained. The flammable refrigerant remaining in the refrigerant pipes flows to a certain extent from the leak portion of the trouble, but the outflow is reduced since no more pressure is applied.

In an embodiment of the present invention, the flammable refrigerant is R32 or a mixed refrigerant that contains 70 percent by weight of R32, or propane or a mixed refrigerant that contains propane.

The refrigerant R32 or a mixed refrigerant that contains 70 percent by weight of R32, or propane or a mixed refrigerant that contains propane are regarded as promising alternative refrigerants substituting for R22. According to the air conditioner of this one embodiment, the accident of a fire or the like can be prevented when R32 or a mixed refrigerant that contains 70 percent by weight of R32, or propane or a mixed refrigerant that contains 70 percent by weight of propane, which are regarded as promising alternative refrigerants substituting for R22, leaks.

BEST MODE FOR CARRYING OUT THE INVENTION

The air conditioner of this invention will be described in detail below on the basis of the embodiments shown in the drawings.

Figure 1:
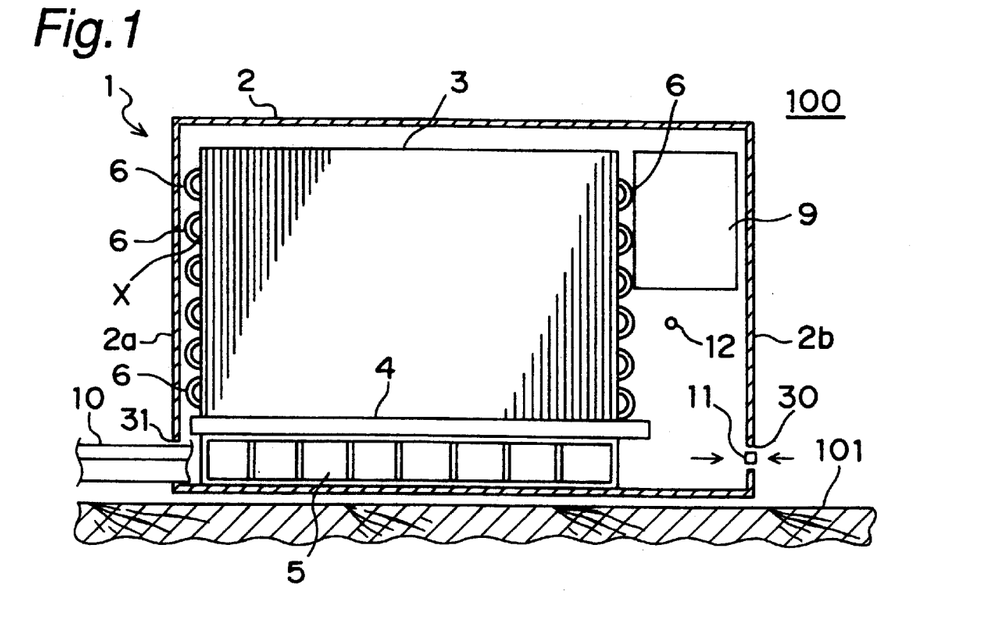
FIG. 1 is a sectional view showing a floor type indoor unit that constitutes an air conditioner according to one embodiment of this invention and is viewed from the front with the front panel removed.
Figure 2:
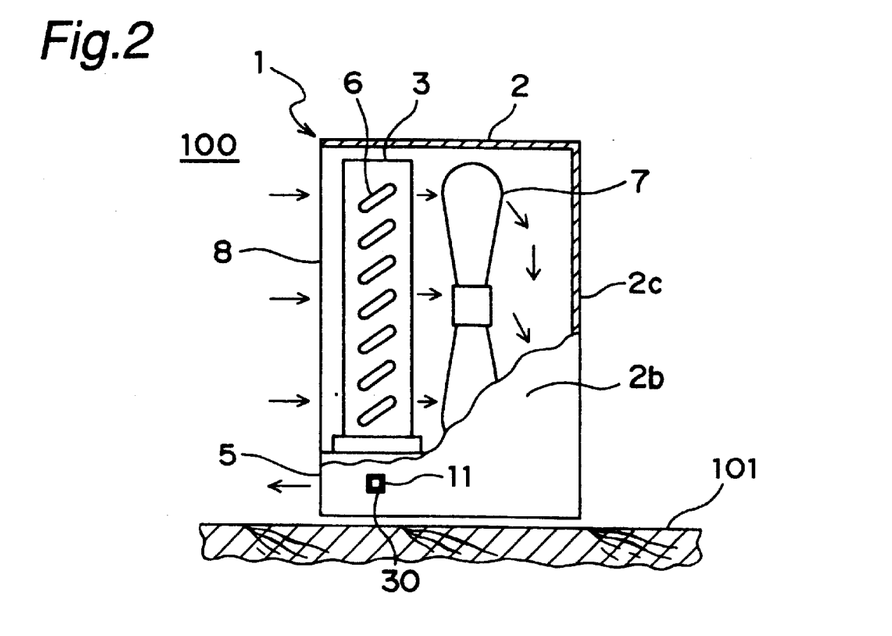
FIG. 2 is a view showing the above indoor unit viewed from the right-hand side with the casing partially removed.

FIG. 1 shows the indoor unit 1 of an air conditioner according to one embodiment, viewed from the front with the front panel removed. FIG. 2 shows the above indoor unit 1 viewed from the right-hand side with the casing 2 partially removed. This indoor unit 1 is of a floor type, provided with a roughly rectangular parallelepiped casing 2 and placed on a floor 101 of a room 100.

As is apparent from FIG. 2, a heat exchanger 3, which has a roughly rectangular parallelepiped external shape, is provided on the front side of the casing 2 and a fan 7 is provided behind the heat exchanger 3 inside the indoor unit 1. A drain pan 4 for receiving dew generated on the surface of the fins of the heat exchanger 3 is provided just below the heat exchanger 3. Further, an outlet port 5 for blowing out air is provided just below this drain pan 4.

As shown in FIG. 1, a pair of connecting pipes 10 for circulating a refrigerant between an outdoor unit (not shown) and the indoor unit 1 is introduced into the indoor unit 1 through a hole 31 provided in a lower portion of a left side plate 2a of the casing 2. The connecting pipes 10 are connected to a heat-transfer pipe 6 of the heat exchanger 3 although not shown in the figure. This air conditioner employs a flammable refrigerant constituted of R32 as a refrigerant.

A hole 30, which inwardly and outwardly penetrates the casing 2, is provided in a lower portion of a right side plate 2b of the casing 2 of the indoor unit 1. A gas sensor 11 for detecting a flammable refrigerant gas of R32 or the like is accommodated in this hole 30. This gas sensor 11 faces both the outside and the inside of the casing 2 and is able to detect the flammable refrigerant gas that has leaked to the outside and inside of the indoor unit 1.

Moreover, a control section 9 for controlling the operation of the entire air conditioner is provided in an upper space adjacent to the right-hand side of the heat exchanger 3 in the casing 2 of the indoor unit 1.

An alarm 12 for issuing a warning when abnormality such as flammable refrigerant leak or the like occurs is provided in a space below the control section 9. This alarm 12 includes a lamp constructed of an LED (light emitting diode) (visible to the resident via a front panel not shown) and a buzzer to inform the resident of the occurrence of abnormality through his or her sense of sight and hearing.

It is to be noted that the control section 9 is backed up by a battery (not shown) and is able to detect the flammable refrigerant gas by the gas sensor 11 and control the alarm 12 even when this air conditioner stops operation (when the power switch is off).

When this air conditioner is in operation, the flammable refrigerant is sent from the outdoor unit to the inside of the indoor unit 1 through one of the connecting pipes 10 under the control of the control section 9, flowed through the heat-transfer pipe 6 of the heat exchanger 3, thereafter flowed outwardly of the indoor unit 1 and sent back to the outdoor unit through the other one of the connecting pipes 10. In the meantime, the fan 7 shown in FIG. 2 is rotated. By this operation, air in a room 100 is taken into the casing 2 through a grill (inlet port) 8 of the front panel and made to pass between the fins of the heat exchanger 3 to exchange heat with the flammable refrigerant. The air that has undergone the heat exchange is flowed downward through a gap between the fan 7 and the back plate 2c of the casing 2 and blown out to the inside of the room 100 through the outlet port 5.

This air conditioner is provided with the gas sensor 11 for detecting the flammable refrigerant gas which faces both the outside and the inside of the casing 2 in the lower portion of the right side plate 2b of the casing 2 of the indoor unit 1. Therefore, when the flammable refrigerant leaks from the connecting pipes 10 into the room 100 or when the flammable refrigerant that has leaked inside the indoor unit 1 flows to the outside of the indoor unit 1 through the gap of the casing 2, the refrigerant that has leaked and gasified can be detected by the gas sensor 11.

That is, the flammable refrigerant of R32 or the like has the property that it is heavier than air. Therefore, the flammable refrigerant that has leaked from the connecting pipes 10 into the room 100 or the flammable refrigerant that has leaked inside the indoor unit 1 and flowed to the outside of the indoor unit 1 through the gap of the casing 2 tends to be collected on the floor 101 of the room 100. In this case, the gas sensor 11 is provided in the lower portion of the casing 2 and faces the outside of the casing 2. Therefore, the flammable refrigerant gas collected on the floor 101 of the room 100 can reliably be detected by the gas sensor 11. The connecting pipes 10 are extended leftward from the indoor unit 1, and the flammable refrigerant that has leaked from the connecting pipes 10 is promptly diffused on the floor 101 of the room 100 and reaches the gas sensor 11 provided on the right side plate 2b of the indoor unit 1.

Moreover, the flammable refrigerant that has leaked inside the indoor unit 1 tends to be collected in the lower portion of the indoor unit 1. In, for example, FIG. 1, the flammable refrigerant, which has leaked from a heat-transfer pipe joint portion X in the upper left-hand portion of the heat exchanger 3, moves downward, reaches the left-hand end portion of the drain pan 4, moves rightward over the drain pan 4, falls from the right-hand edge portion of the drain pan 4 and reaches the neighborhood of the gas sensor 11. In this case, the gas sensor 11 is provided in the lower portion of the casing 2 and faces not only the outside but also the inside of the casing 2. Therefore, not only the flammable refrigerant gas that has leaked to the outside of the indoor unit 1 but also the flammable refrigerant gas that has leaked inside the indoor unit 1 as described above can reliably be detected by the gas sensor 11.

Figure 3:
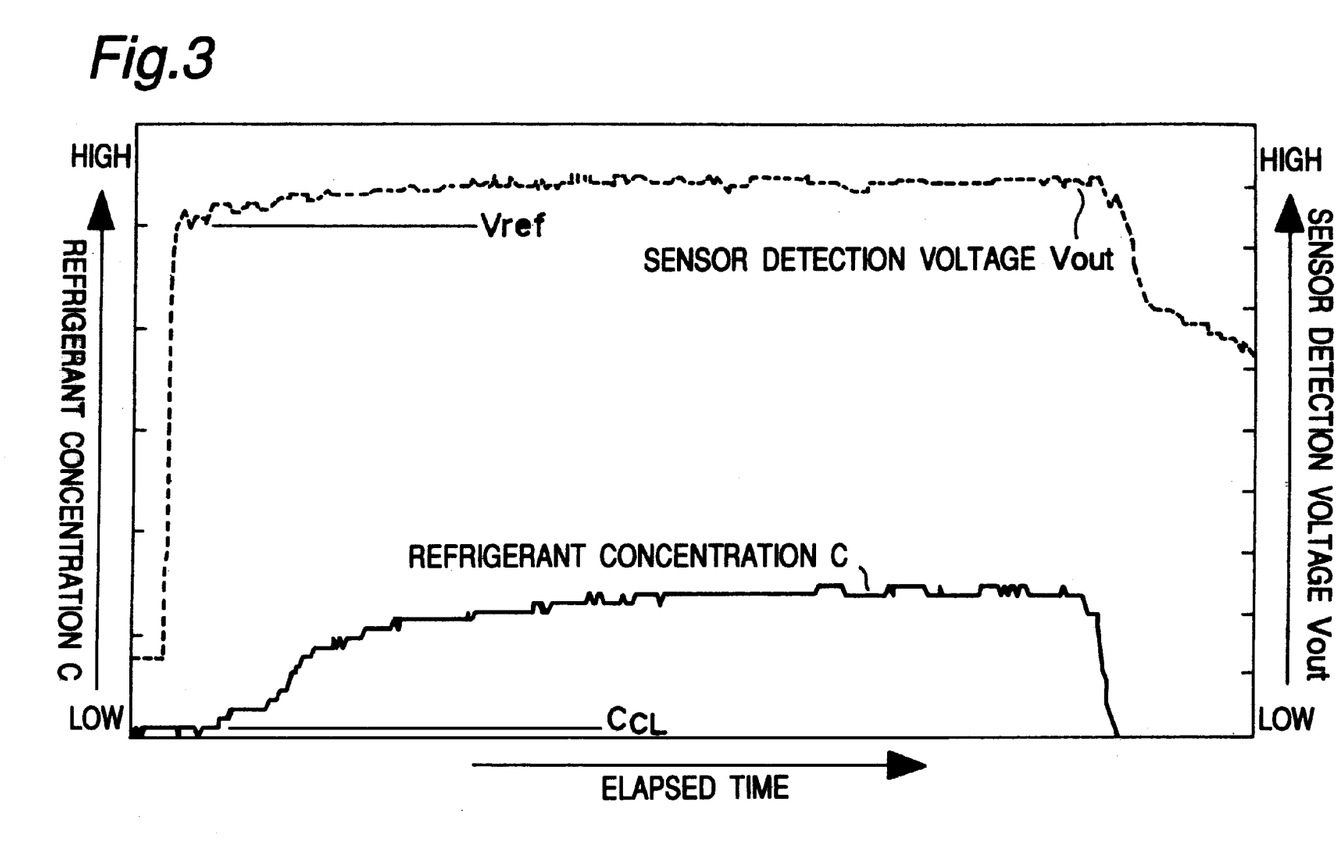
FIG. 3 is a graph showing a change in a sensor detection voltage Vout according to change in a refrigerant concentration C with a lapse of time from the start of leak.

FIG. 3 shows a change in the output (sensor detection voltage) Vout of the gas sensor 11 according to a change in a refrigerant concentration C with a lapse of time from the start of leak when the flammable refrigerant leaks from the heat-transfer pipe joint portion X located in the upper left-hand portion of the heat exchanger 3. As is apparent, the sensor detection voltage Vout becomes higher as the refrigerant concentration C increases. It is to be noted that the reference value Vref shown in FIG. 3 corresponds to the value indicated by the sensor detection voltage Vout when the concentration C of the flammable refrigerant gas becomes a lower flammability limit concentration $C_{CL}$.

Figure 4:
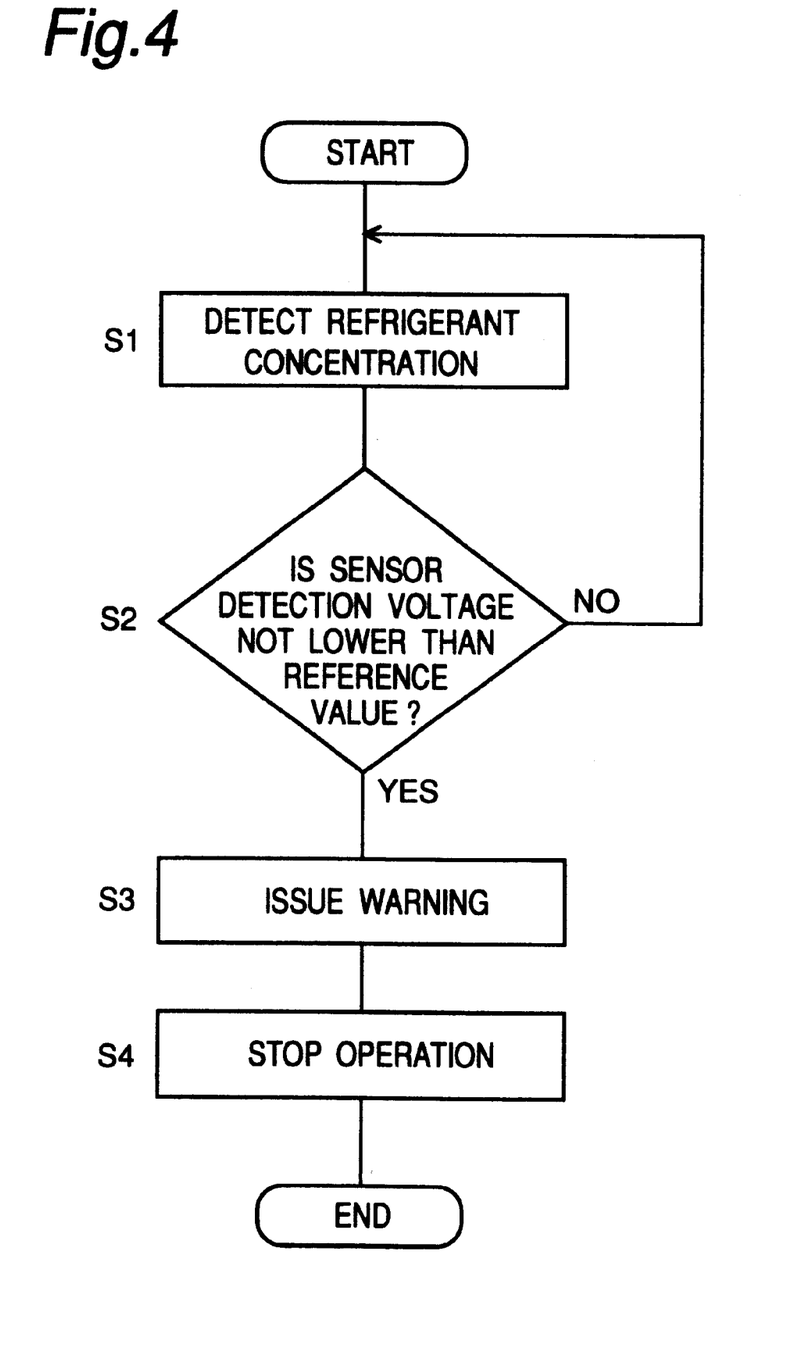
FIG. 4 is a chart showing a control flow of the control section of the above air conditioner.

FIG. 4 shows a control flow of the control section 9. As shown in this FIG. 4, the control section 9 constantly detects the refrigerant concentration C by the gas sensor 11 (S1) and determines whether or not the sensor detection voltage Vout is not lower than the reference value Vref (S2). If the sensor detection voltage Vout is lower than the reference value Vref, then it is determined that the flammable refrigerant is not leaked, and the refrigerant concentration detection by the gas sensor 11 is continued. When the sensor detection voltage Vout is not lower than the reference value Vref, then it is determined that the flammable refrigerant is leaked, and a warning is immediately issued by the alarm 12 (S3). In concrete, the LED lamp is flashed and the buzzer is beeped to inform the resident of the event that the flammable refrigerant is leaked through his or her sense of sight and hearing. By this operation, the user can perceive that the flammable refrigerant is leaked and is allowed to take the measures of ventilating the room 100, calling serviceman for repair and the like. Moreover, the control section 9 immediately executes the control to stop the operation of the refrigerant circuit upon determining that the flammable refrigerant is leaked (S4). By this operation, even if this air conditioner is in operation, the refrigerant circuit can immediately be shut off by the valve that exists in the refrigerant circuit, and this enables the restraint of the leak of a large amount of flammable refrigerant. As a result, the accident of a fire or the like can be prevented.

In this embodiment, the gas sensor 11 for detecting the flammable refrigerant gas while facing both the outside and the inside of the casing 2 is provided in the lower portion of the right side plate 2b of the casing 2 of the indoor unit 1. Therefore, the flammable refrigerant gas that has leaked from this indoor unit 1 and its surroundings can infallibly be detected by the gas sensor 11. Therefore, this indoor unit 1 is permitted to have only one gas sensor for detecting the flammable refrigerant gas in order to prevent the accident of a fire or the like, and cost increase can be suppressed.

Figure 5:
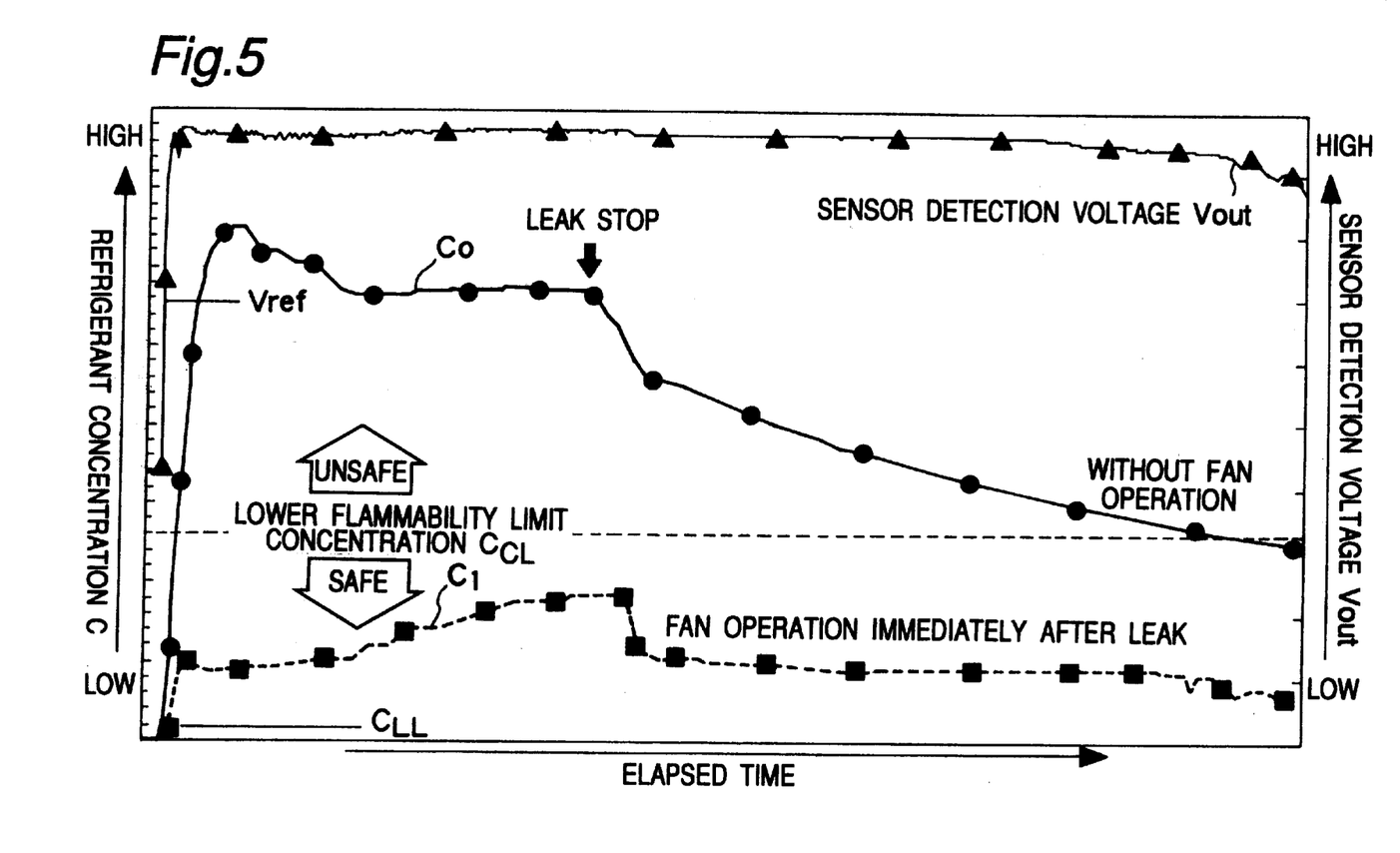
FIG. 5 is a graph showing a change in the sensor detection voltage Vout according to a change in the refrigerant concentration C with a lapse of time from the start of leak.

FIG. 5 shows a change in the output (sensor detection voltage) Vout of the gas sensor 11 according to a change in the refrigerant concentration C with a lapse of time from the start of leak when the flammable refrigerant leaks from the heat-transfer pipe joint portion X located in the upper left-hand portion of the heat exchanger 3 experimentally for only a certain period. In FIG. 5, the value $C_0$ indicates a change in the refrigerant concentration when the fan 7 is maintained in the stopped state during the experiment. On the other hand, the value $C_1$ indicates a change in the refrigerant concentration when the fan 7 is rotated concurrently with the start of leak and the rotation is maintained. The change in the sensor detection voltage Vout shown in the figure corresponds to the former value $C_0$. From this result, it can be understood that the refrigerant concentration C can be maintained below the lower flammability limit concentration $C_{CL}$ when the fan 7 is rotated immediately when the flammable refrigerant leaks. It is to be noted that the reference value Vref shown in FIG. 5 corresponds to the value indicated by the sensor detection voltage Vout when the concentration C of the flammable refrigerant gas becomes a reference concentration $C_{LL}$ not higher than the lower flammability limit concentration $C_{CL}$. This reference concentration $C_{LL}$ is set as low as possible within a range in which it can be distinguished from noises.

Figure 6:
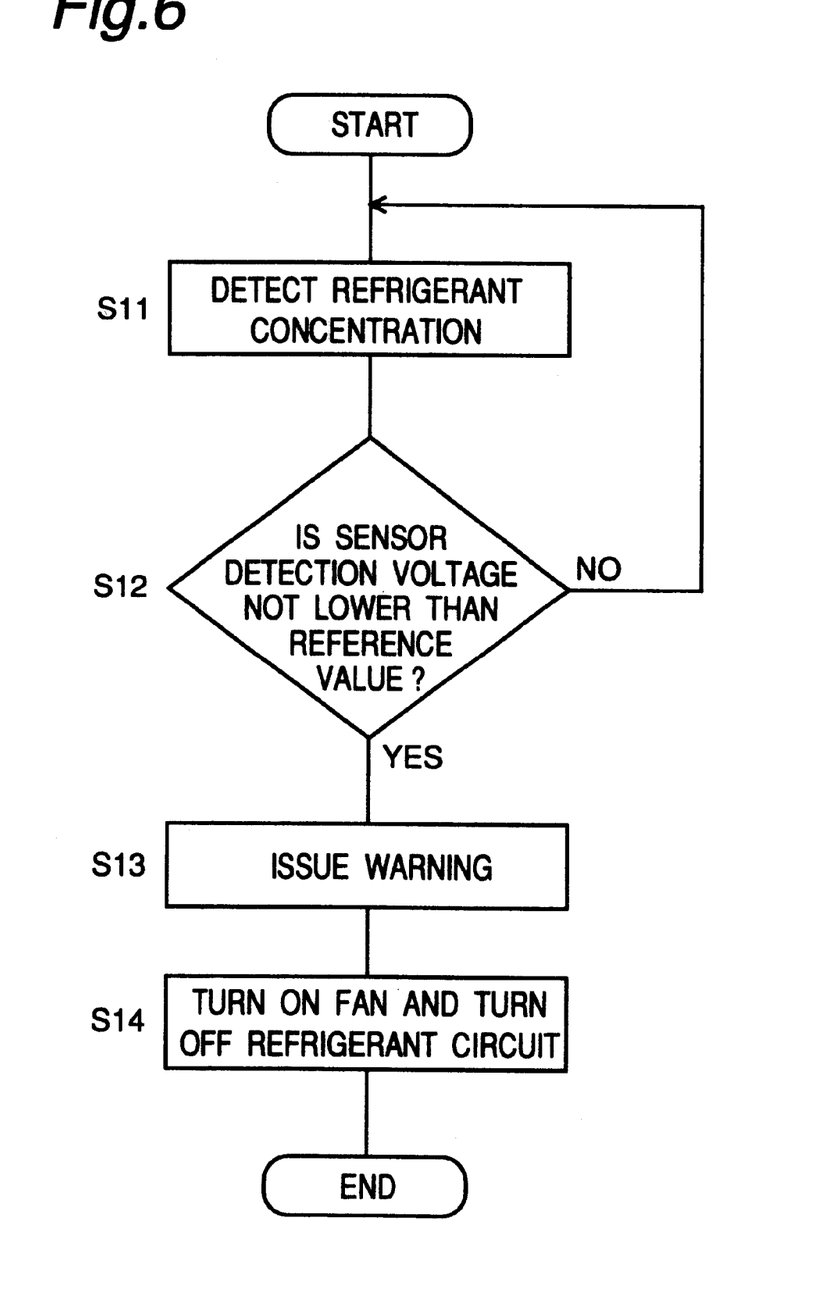
FIG. 6 is a chart showing another control flow of the control section of the above air conditioner.

FIG. 6 shows another control flow of the control section 9. As shown in this FIG. 6, the control section 9 constantly detects the refrigerant concentration C by the gas sensor 11 (S11) and determines whether or not the sensor detection voltage Vout is not lower than the reference value Vref (S12). If the sensor detection voltage Vout is lower than the reference value Vref, then it is determined that the flammable refrigerant is not leaked, and the refrigerant concentration detection by the gas sensor 11 is continued. When the sensor detection voltage Vout is not lower than the reference value Vref, then it is determined that the flammable refrigerant is leaked, and a warning is immediately issued by the alarm 12 (S13). In concrete, the LED lamp is flashed and the buzzer is beeped to inform the resident of the event that the flammable refrigerant is leaked through his or her sense of sight and hearing. By this operation, the user can perceive that the flammable refrigerant is leaked and is allowed to take the measures of ventilating the room 100, calling serviceman for repair and the like. Moreover, the control section 9 immediately executes the control to rotate the fan 7 and stop the operation of the refrigerant circuit upon determining that the flammable refrigerant is leaked (S14). By rotating the fan 7, the flammable refrigerant that has leaked from the connecting pipes 10 into the room 100, the flammable refrigerant that has leaked inside the indoor unit 1 and further the flammable refrigerant gas that has leaked inside the indoor unit 1 and flowed to the outside of the indoor unit 1 through the gap of the casing 2 can be effectively diffused to have a concentration not higher than the lower flammability limit concentration by virtue of the air flow generated by the rotation of the fan 7, i.e., the flow of air that has been taken into the casing 2 through the front grill 8 and blown out to the inside of the room 100 through the outlet port 5. As a result, the accident of a fire or the like can be prevented. Moreover, by executing the control to stop the operation of the refrigerant circuit, the refrigerant circuit can immediately be shut off by the valve that exists in the refrigerant circuit even when this air conditioner is in operation, and this enables the restraint of the leak of a large amount of flammable refrigerant. As a result, the accident of a fire or the like can reliably be prevented.

In this embodiment, the gas sensor 11 for detecting the flammable refrigerant gas while facing both the outside and the inside of the casing 2 is provided in the lower portion of the right side plate 2b of the casing 2 of the indoor unit 1. Therefore, the flammable refrigerant gas that has leaked from this indoor unit 1 and its surroundings can infallibly be detected by the gas sensor 11. Therefore, this indoor unit 1 is permitted to have only one gas sensor for detecting the flammable refrigerant gas in order to prevent the accident of a fire or the like, and cost increase can be suppressed.

Moreover, the fan 7 and (hardware that constitutes) the control section 9 are originally provided for the indoor unit 1. Therefore, in applying the present invention to an ordinary air conditioner, no particular cost increase is caused.

Figure 7:
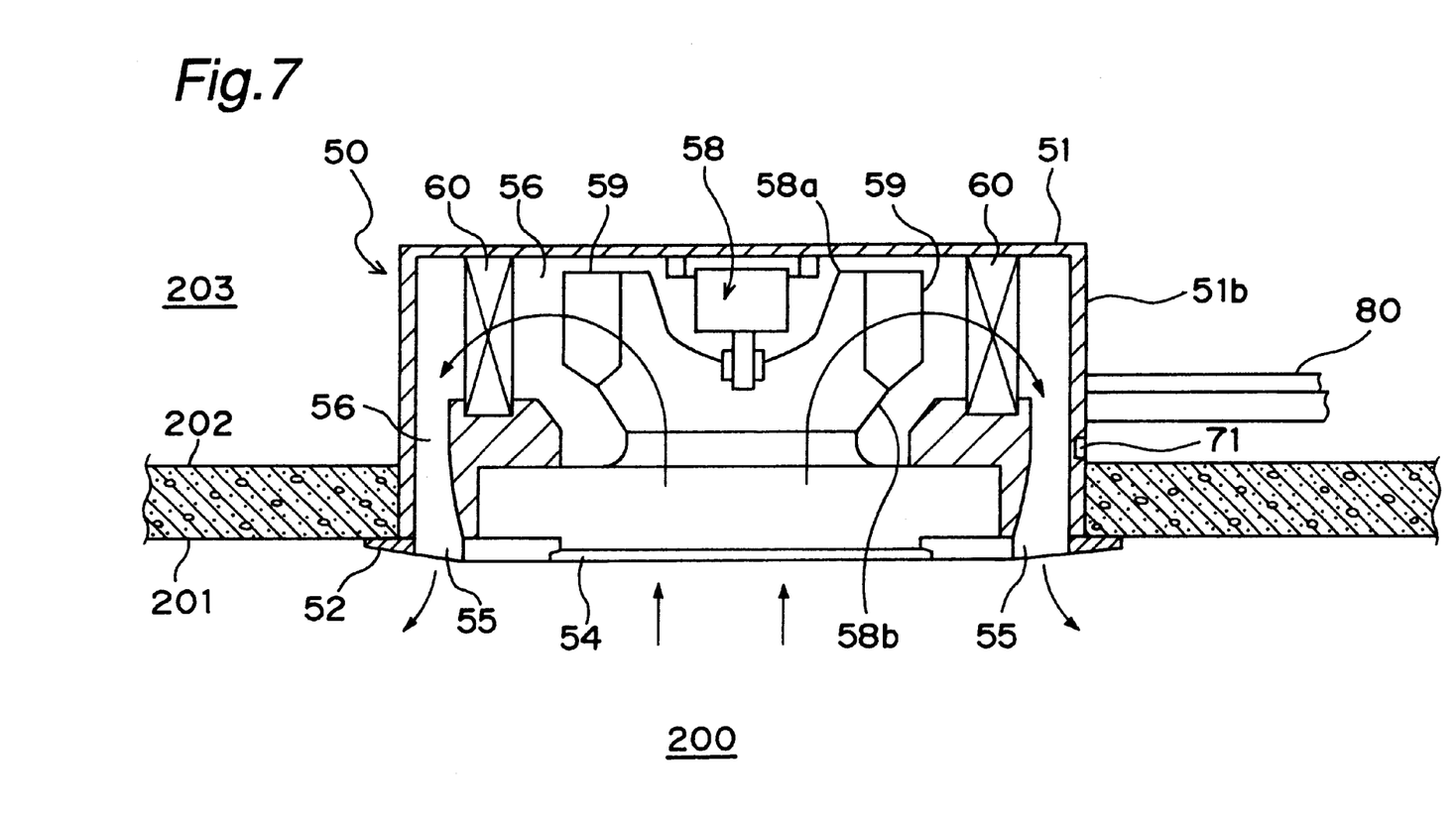
FIG. 7 is a sectional view showing a ceiling type indoor unit that constitutes an air conditioner according to another embodiment of this invention and is viewed from a side.

FIG. 7 shows a cross-section of the indoor unit 50 of an air conditioner according to another embodiment, viewed from a side. This indoor unit 50 is of a ceiling recessed type, which is provided with a roughly rectangular parallelepiped casing 51 and fit in a ceiling 201 from the room 200 side. A decorative panel 52 on the lower surface of the casing 51 is provided with an air inlet grill 54 located in a center portion, air outlet ports 55, 55, . . . located in peripheral portions, and there is an air passage 56 located between the air inlet grill 54 and the air outlet ports 55, 55, . . . The casing 51 internally has a built-in turbofan 58 located in a center portion, and this turbofan 58 has a plurality of blades 59, 59, . . . arranged at regular intervals in the circumferential direction between a main plate 58a and a side plate 58b. Then, a heat exchanger 60 is arranged so as to surround this turbofan 58 and face the blades 59, 59, . . .

A pair of connecting pipes 80 for circulating a refrigerant between a central unit (not shown) provided in one place of the entire building and this indoor unit 50 is introduced into the indoor unit 50 through a ceiling space 203 while penetrating the side plate of the casing 51. The connecting pipes 80 are connected to the heat-transfer pipe of the heat exchanger 60, which are not shown in the figure. This air conditioner employs a flammable refrigerant constituted of R32 as a refrigerant.

A gas sensor 71 for detecting the flammable refrigerant gas is mounted in a lower portion that belongs to the casing 51 of the indoor unit 50 and faces the reverse side 202 of ceiling board. This gas sensor 71 is exposed to the outside of the casing 51 and buried in the external surface of casing 51 so that the sensor does not disturb the work and the like for fitting the indoor unit 50 into the hole of the ceiling 201.

When this air conditioner is in operation, the flammable refrigerant is sent from the central unit to the inside of the indoor unit 50 through one of the connecting pipes 80 under the control of the control section (not shown), flowed through the heat-transfer pipe of the heat exchanger 60, thereafter flowed outwardly of the indoor unit 50 and sent back to the central unit through the other one of the connecting pipes 80. In the meantime, the turbofan 58 is rotated. By this operation, air in the room 200 is taken into the casing 51 through the inlet grill 54, moved up and blown out in the centrifugal direction by the blades 59, 59, . . . of the turbofan 58 and thereafter made to pass between the fins of the heat exchanger 60 to exchange heat with the flammable refrigerant. The air that has undergone the heat exchange is flowed downward through the air passage 56 and blown out to the inside of the room 200 through the outlet port 55.

When the flammable refrigerant leaks from the connecting pipes 80 to the ceiling space 203 or when the flammable refrigerant that has leaked inside the indoor unit 50 flows into the ceiling space 203 through the gap of the casing 51, the leaked flammable refrigerant is collected on the reverse side 202 of ceiling board since the flammable refrigerant of R32 or the like has the property that it is heavier than air. In this case, the gas sensor 71 is provided in the lower portion that belongs to the indoor unit 50 and faces the reverse side 202 of ceiling board while being exposed to the outside of the casing 51. Therefore, the leaked flammable refrigerant can reliably be detected by the gas sensor 71. Therefore, it is enabled to issue a warning based on the output of the sensor or shut off the refrigerant circuit under the control of the control section. As a result, the accident of a fire or the like can be prevented.

Although the flammable refrigerant is constituted of R32 in each of the embodiments, the flammable refrigerant is, of course, not limited to this. This invention can broadly be applied to air conditioners that employ a flammable refrigerant such as a mixed refrigerant that contains 70 percent by weight of R32, or propane or a mixed refrigerant that contains propane.

As is apparent from the above, according to the air conditioner of the present invention, even when the flammable refrigerant is leaked, the leaked flammable refrigerant can be detected by the sensor. Therefore, the accident of a fire or the like can be prevented.

What is claimed is:

1. An air conditioner employing a flammable refrigerant, comprising:
   a sensor that is provided on an external surface of an indoor unit and detects a flammable refrigerant gas, wherein
   the indoor unit is of a floor type, and
   the sensor is provided in a lower portion of the indoor unit.

2. The air conditioner as claimed in claim 1, comprising: means for issuing a warning when the sensor detects the flammable refrigerant gas.

3. The air conditioner as claimed in claim 1, comprising: a control section for executing control to stop operation of a refrigerant circuit of the air conditioner when the sensor detects the flammable refrigerant gas.

4. The air conditioner as claimed in claim 1, wherein the flammable refrigerant is R32 or a mixed refrigerant that contains 70 percent by weight of R32, or propane or a mixed refrigerant that contains propane.

5. An air conditioner employing a flammable refrigerant, comprising:
   a sensor that is provided on an external surface of an indoor unit and detects a flammable refrigerant gas, wherein
   the indoor unit is of a ceiling recessed type, and
   the sensor is provided in a lower portion that belongs to the indoor unit and faces the reverse side of a ceiling board.

6. The air conditioner as claimed in claim 5, comprising: means for issuing a warning when the sensor detects the flammable refrigerant gas.

7. The air conditioner as claimed in claim 5, comprising: a control section for executing control to stop operation of a refrigerant circuit of the air conditioner when the sensor detects the flammable refrigerant gas.

8. The air conditioner as claimed in claim 5, wherein the flammable refrigerant is R32 or a mixed refrigerant that contains 70 percent by weight of R32, or propane or a mixed refrigerant that contains propane.

9. An air conditioner employing a flammable refrigerant, comprising:
   a sensor that is provided on an external surface of an indoor unit and detects a flammable refrigerant gas, wherein
   the sensor is arranged in an opening located in a lower portion of the casing of the indoor unit and detects a flammable refrigerant gas leaked to the outside and inside of the indoor unit.

10. The air conditioner as claimed in claim 9, comprising: means for issuing a warning when the sensor detects the flammable refrigerant gas.

11. The air conditioner as claimed in claim 9, comprising: a control section for executing control to stop operation of a refrigerant circuit of the air conditioner when the sensor detects the flammable refrigerant gas.

12. The air conditioner as claimed in claim 9, wherein the flammable refrigerant is R32 or a mixed refrigerant that contains 70 percent by weight of R32, or propane or a mixed refrigerant that contains propane.

13. An air conditioner which is provided with an indoor unit housing a heat exchanger and a fan inside a casing thereof that has an inlet port and an outlet port, rotates the fan and flows the flammable refrigerant through the heat exchanger during operation, performing heat exchange between air taken into the casing through the inlet port and the flammable refrigerant, and blows out the air that has undergone the heat exchange to the inside of a room through the outlet port, comprising:
   a sensor that is provided on an external surface of the casing and detects a flammable refrigerant gas; and
   a control section for executing control to rotate the fan when the sensor detects the flammable refrigerant gas, wherein
   the indoor unit is of a floor type, and
   the sensor is provided in a lower portion of the indoor unit.

14. The air conditioner as claimed in claim 13, comprising:
   means for issuing a warning when the sensor detects the flammable refrigerant gas.

15. The air conditioner as claimed in claim 13, comprising:
   a control section for executing control to stop operation of a refrigerant circuit of the air conditioner when the sensor detects the flammable refrigerant gas.

16. The air conditioner as claimed in claim 13, wherein the flammable refrigerant R32 or a mixed refrigerant that contains 70 percent by weight of R32, or propane or a mixed refrigerant that contains propane.

17. An air conditioner, which is provided with an indoor unit housing a heat exchanger and a fan inside a casing thereof that has an inlet port and an outlet port, rotates the fan and flows the flammable refrigerant through the heat exchanger during operation, performing heat exchange between air taken into the casing through the inlet port and the flammable refrigerant, and blows out the air that has undergone the heat exchange to the inside of a room through the outlet port, comprising:
   a sensor that is provided on an external surface of the casing and detects a flammable refrigerant gas; and
   a control section for executing control to rotate the fan when the sensor detects flammable refrigerant gas, wherein
   the sensor is arrange in an opening located in a lower portion of the casing of the indoor unit and detects a flammable refrigerant gas leaked to the outside and inside of the indoor unit.

18. The air conditioner as claimed in claim 17, comprising:
   means for issuing a warning when the sensor detects the flammable refrigerant gas.

19. The air condition as claimed in claim 17, comprising:
   a control section for executing control to stop operation of a refrigerant circuit of the air conditioner when the sensor detects the flammable refrigerant gas.

20. The air conditioner as claimed in claim 17, wherein the flammable refrigerant is R32 or a mixed refrigerant that contains 70 percent by weight of R32, or propane or a mixed refrigerant that contains propane.

* * * * *